Figure 1:
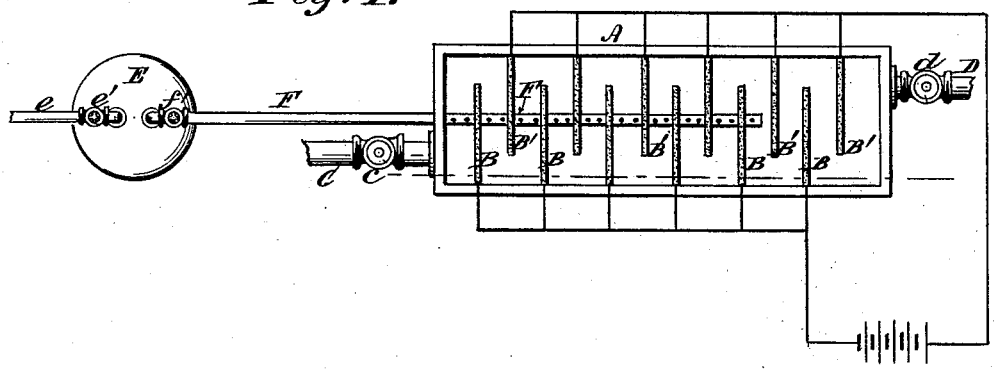

(No Model.)

C. G. COLLINS.
PROCESS OF PURIFYING WATER.

No. 478,048. Patented June 28, 1892.

Witnesses:
D. W. Gardner
G. T. Miatt

Inventor:
Caleb Crozier Collins
By his Attorney
George William Miatt

THE NORRIS PETERS CO., PHOTO-LITHO., WASHINGTON, D. C.

UNITED STATES PATENT OFFICE.

CALEB GROZIER COLLINS, OF KEARNEY, NEW JERSEY, ASSIGNOR TO CALVIN AMORY STEVENS, OF NEW YORK, N. Y.

PROCESS OF PURIFYING WATER.

SPECIFICATION forming part of Letters Patent No. 478,048, dated June 28, 1892.

Application filed May 2, 1891. Serial No. 391,404. (No specimens.)

*To all whom it may concern:*

Be it known that I, CALEB GROZIER COLLINS, a citizen of the United States, residing at Kearney, in the county of Hudson and State of New Jersey, have invented certain new and useful Improvements in the Purification of Liquids, of which the following is a description sufficient to enable others skilled in the art to which the invention appertains to use the same.

My invention relates to the purification of water generally by the precipitation of foreign matter held in solution or suspension therein by the aid of the electric current, and is especially applicable to the treatment of water for domestic uses, manufacturing purposes, the generation of steam in boilers, &c. In the treatment of liquids by electrolysis it is well recognized that the purification is effected largely by the ozone which is liberated by the decomposition of water. Heretofore, however, this process of purification by the aid of electricity has been slow, incomplete, and generally unsatisfactory owing to the comparatively small amount of ozone formed under the influence of the electric current. I have discovered that the formation of the ozone within the water under treatment is dependent upon the presence therein of free oxygen, on which nascent oxygen, liberated by the decomposition of the water by the electric current reacts, converting it into ozone, and also that the fault with the process of purification by electrolysis heretofore known or used rests in the fact that the electric current must first charge the liquid with oxygen before any considerable amount of ozone can be produced in the solution.

The object of my invention is to attain a more perfect and rapid destruction or precipitation of the impurities held in suspension or solution in the water than has heretofore been accomplished under the influence of the electric current; and my invention consists, essentially, in treating the water to be purified to the simultaneous action of an electric current and an independent supply of oxygen introduced continuously into the solution during the passage of the said electric current, so that the nascent oxygen generated continuously by the decomposition of water by the electric current will immediately combine with the dissolved oxygen, which is in excess in the solution, producing thereby a maximum amount of ozone under conditions most favorable for the complete and rapid purification of the water by the destruction of the impurities or their reduction to the insoluble state, so that they may be conveniently eliminated by filtration or otherwise.

In the accompanying drawings I illustrate diagrammatically means for carrying out my improved process of destroying or rendering the impurities in water insoluble, although I do not confine myself to any special form or arrangement of apparatus, the essential feature in this respect consisting in any arrangement of the parts whereby oxygen may be continuously introduced into and dissolved by the water while under the influence of the electric current in such manner that the nascent oxygen liberated by the decomposition of water by the said electric current will immediately combine with the free oxygen introduced into the solution to form ozone, the action of which in destroying or rendering insoluble impurities held in suspension or solution is well known.

Figure 2:
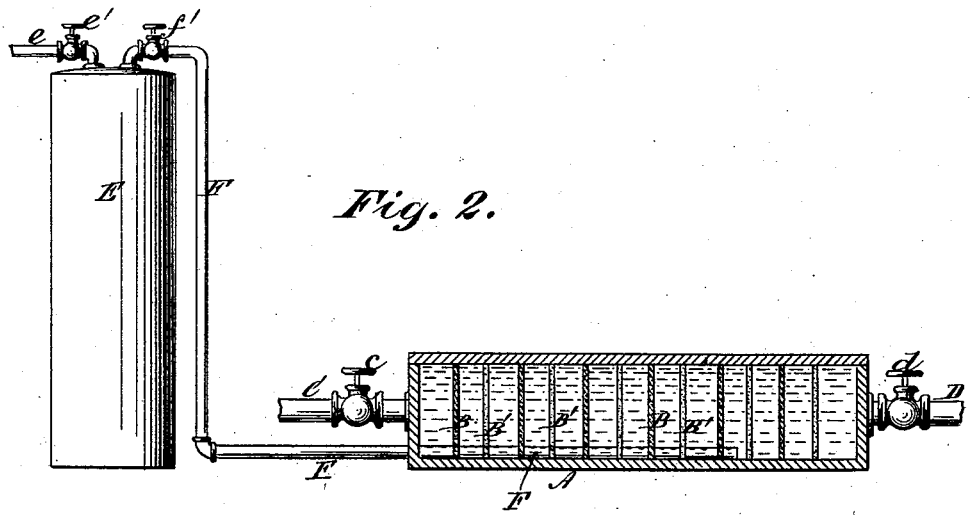

Figure 1 is a plan, and Fig. 2 a sectional elevation, of apparatus sufficient to effect the carrying out of my process.

In the drawings, A represents an elongated tank or chamber, in which electrodes B B', of carbon, platinum, or other material not prejudicially acted upon by the oxygen or by the impurities contained in the liquid under treatment, are arranged alternately, said electrodes being connected with the respective poles of a battery, dynamo, or other source of electricity.

C is the liquid-supply pipe, having gate-valve *c* and the exit-pipe D, also provided with valve *d*, by which the flow of the liquid from the chamber A may be regulated. It is obvious that this channel or chamber A may be varied in form and construction materially without deviating from my invention. It may consist of a mere section of an ordinary main or pipe system and may be inclosed or open to the atmosphere. I prefer, however, to close it, so that the oxygen may be introduced under pressure and its escape retarded as far as possible.

The oxygen may be supplied from any convenient source, that shown in the drawings consisting of a reservoir E, charged with the compressed gas, e being the charging-pipe, with valve e', and F the distributing-pipe, with valve f'. The distributing-pipe F passes into the chamber A, the section of pipe therein being perforated to allow the escape of the oxygen into the chamber and contents. By this arrangement the liquid under treatment may be simultaneously charged with oxygen and subjected to the action of an electric current, so that by allowing the liquid to flow through the chamber A the process may be rendered continuous.

Impurities that are precipitated and rendered insoluble by my process may be removed by filtration or may be allowed to settle.

I am aware that air has been forced mechanically into water for the purpose of purifying the same by contact and agitation therewith after the manner of natural phenomena—as, for instance, in patent to Collins, No. 240,813, dated May 3, 1881.

I am also aware that electricity is used alone for the purification of liquids, as in the English patent to Phillips, No. 2,761 of 1888. I not only expressly disclaim such processes, but confine myself exclusively to the purification of water by destroying or rendering its impurities insoluble by the simultaneous treatment thereof with free oxygen and an electric current.

The new and valuable results attained by my special process prove the utility of my invention, said results including the rapidity and thoroughness with which the impurities are destroyed or rendered insoluble and the perfection of purification of the water obtained thereby as compared with all prior methods. For instance, where air alone is forced mechanically through the water very little oxidation can take place in proportion to the volume of air introduced and the time devoted to the treatment. On the other hand, if electricity alone is used the treatment has to be prolonged until the water becomes charged with free oxygen by the decomposition of the water before ozone is produced in sufficient quantity to effect any practical degree of purification, whereas upon starting my improved process of treatment the water simultaneously with free oxygen and to the decomposing action of the electric current ozonification and purification commence immediately within the solution, the excess of oxygen insuring the utilization of the nascent oxygen given off by the action of the electric current on the water for the instantaneous generation of ozone, which permeates through the whole body of water, attacking and precipitating all the impurities contained therein.

I am also aware that the use of electricity in conjunction with air or oxygen has been suggested as a means of aging or ripening wines and other liquors, as in the patent to Storm, No. 57,009; but this does not anticipate my invention, which is not designed for or adapted to the aging of liquors.

The very object of my improved process is to destroy the impurities in the water or render them insoluble. In the treatment of liquors for aging there are no impurities to remove, the aging of the liquor consisting in the formation of ethers, &c., therein, which impart the required "bouquet," and there being no precipitation or elimination, but rather a strengthening of the liquid by concentration. Furthermore, the process of aging liquor disclosed by Storm is intermittent, only a comparatively small body of liquor being capable of treatment at one time, whereas my process of destroying or precipitating the impurities in water is continuous, the water to be purified as it flows freely through the apparatus passing under the combined influence of the free oxygen and the electric current for a suitable distance or length of time and then flowing off without interruption.

By my improved process far more work (decomposition and precipitation) is effected in a given time and with a given expenditure of energy than has heretofore been attainable by the use of electricity for this purpose, and the use of a continuous independent supply of free oxygen in conjunction with the electric current is the novel and distinguishing feature of my invention.

What I claim as my invention, and desire to secure by Letters Patent, is—

The continuous process of purifying water herein set forth, consisting in rendering impurities contained therein insoluble or destroying them by the action simultaneously of a supply of free oxygen independently introduced and the decomposing action of an electric current, substantially in the manner set forth.

CALEB GROZIER COLLINS.

Witnesses:
G. T. MIATT,
GEORGE WILLIAM MIATT.